United States Patent
Sawada et al.

(10) Patent No.: US 11,117,237 B2
(45) Date of Patent: *Sep. 14, 2021

(54) MACHINE TOOL PROVIDED WITH SPINDLE HAVING MEASUREMENT FUNCTION

(71) Applicant: NAKAMURA-TOME PRECISION INDUSTRY CO., LTD., Ishikawa (JP)

(72) Inventors: Manabu Sawada, Kanazawa (JP); Naotsugu Nishimura, Hakusan (JP)

(73) Assignee: NAKAMURA-TOME PRECISION INDUSTRY CO., LTD., Hakusan (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/601,645

(22) Filed: Oct. 15, 2019

(65) Prior Publication Data
US 2020/0122240 A1    Apr. 23, 2020

(30) Foreign Application Priority Data

Oct. 18, 2018 (JP) .............................. JP2018-196258

(51) Int. Cl.
*B23B 31/177* (2006.01)
*B23Q 17/20* (2006.01)
(Continued)

(52) U.S. Cl.
CPC ........ *B23Q 17/20* (2013.01); *B23B 31/16258* (2013.01); *B23Q 17/003* (2013.01);
(Continued)

(58) Field of Classification Search
CPC .................. B23Q 17/20; B23Q 17/003; B23B 31/16266; B23B 31/16258;
(Continued)

(56) References Cited

U.S. PATENT DOCUMENTS 3,936,060 A * 2/1976 Hirao ...................... B23B 31/26
279/126
4,443,021 A * 4/1984 Buchholz ................. B23Q 3/16
279/4.02
(Continued)

FOREIGN PATENT DOCUMENTS

EP     0556049 A2    8/1993
EP     3199297 A1    8/2017
(Continued)

OTHER PUBLICATIONS

U.S. Appl. No. 16/601,664, filed Oct. 15, 2019 in the name of Manabu Sawada et al.
Mar. 26, 2020 Search Report issued in European Patent Application No. 19203331.4.
(Continued)

*Primary Examiner* — Eric A. Gates
*Assistant Examiner* — Chwen-Wei Su
(74) *Attorney, Agent, or Firm* — Oliff PLC

(57) ABSTRACT

A machine tool includes: a hollow spindle including a hollow portion along an axial direction; a plurality of chuck claws openably mounted at a distal end portion of the hollow spindle, and configured to hold a workpiece; an operation rod inserted into the hollow portion of the hollow spindle in a movable manner, and configured to close the plurality of chuck claws with movement of the operation rod toward one side in the axial direction and open the plurality of chuck claws with movement of the operation rod toward the other side in the axial direction; and a measuring apparatus configured to measure an opening dimension of the plurality of chuck claws based on a movement amount of the operation rod.

3 Claims, 5 Drawing Sheets

(51) Int. Cl.
  *G05B 19/401* (2006.01)
  *B23Q 17/00* (2006.01)
  *B23B 31/175* (2006.01)

(52) U.S. Cl.
  CPC ........ *G05B 19/401* (2013.01); *B23B 31/1622* (2013.01); *B23B 31/16229* (2013.01); *B23B 31/16266* (2013.01); *B23B 2231/10* (2013.01); *B23B 2231/26* (2013.01); *B23B 2260/128* (2013.01); *G05B 2219/37207* (2013.01); *G05B 2219/37236* (2013.01); *Y10T 279/1906* (2015.01); *Y10T 279/1973* (2015.01); *Y10T 279/21* (2015.01)

(58) Field of Classification Search
  CPC .......... B23B 31/1622; B23B 31/16229; B23B 2231/10; B23B 2231/26; B23B 2260/128; G05B 19/401; G05B 2219/37207; G05B 2219/37236; Y10T 279/1906; Y10T 279/1973; Y10T 279/21
  See application file for complete search history.

(56) References Cited

U.S. PATENT DOCUMENTS

| | | | | |
|---|---|---|---|---|
| 6,079,303 | A | * | 6/2000 | Lyachovitsky ......... B23B 31/28 279/114 |
| 6,478,310 | B1 | * | 11/2002 | Azami ................ B23B 31/1622 279/4.02 |
| 8,991,288 | B2 | | 3/2015 | Watanabe |
| 9,731,394 | B2 | * | 8/2017 | Yoshimura ........... G05B 19/404 |
| 10,130,999 | B2 | | 11/2018 | Miyamoto et al. |
| 10,393,496 | B2 | * | 8/2019 | Chen .......................... B25B 5/16 |
| 2017/0209939 | A1 | * | 7/2017 | Miyamoto .............. B23B 31/30 |
| 2017/0282322 | A1 | | 10/2017 | Mori |
| 2019/0369596 | A1 | * | 12/2019 | Kamiguchi .......... G05B 19/401 |
| 2019/0384253 | A1 | * | 12/2019 | Ozeki .................... G06N 20/00 |

FOREIGN PATENT DOCUMENTS

| | | |
|---|---|---|
| JP | 2000-343474 A | 12/2000 |
| JP | 2017-131982 A | 8/2017 |

OTHER PUBLICATIONS

Sep. 29, 2020 Office Action issued in U.S. Appl. No. 16/601,664.
Mar. 25, 2021 Office Action issued in U.S. Appl. No. 16/601,664.

\* cited by examiner

MACHINE TOOL PROVIDED WITH SPINDLE HAVING MEASUREMENT FUNCTION

The contents of Japanese Patent Application No. 2018-196258 filed on Oct. 18, 2018 are incorporated in the present application.

BACKGROUND

The present disclosure relates to a machine tool including a spindle provided with a chuck for holding a workpiece.

In a machine tool, such as a lathe or a composite processing machine, a chuck for holding a workpiece is mounted at a distal end portion of a spindle.

In this case, a hollow spindle including a hollow hole extending in an axial direction is adopted, and an operation rod is inserted into this hollow hole. In a machine tool including the hollow spindle, the opening/closing motion of the chuck is performed by moving the operation rod forward and backward.

The present applicant has proposed an apparatus for controlling opening/closing of a chuck where the position where a workpiece is held and the position where the workpiece is released are detected by utilizing a chuck opening/closing mechanism provided to a spindle of this machine tool, thus facilitating preparatory work when the kind of the workpiece is changed, and preventing erroneous setting of the position of the operation rod at the time of holding the workpiece (referred to as "workpiece holding position") (JP-A-2017-131982).

DESCRIPTION OF EXEMPLARY EMBODIMENTS

Figure 1A:
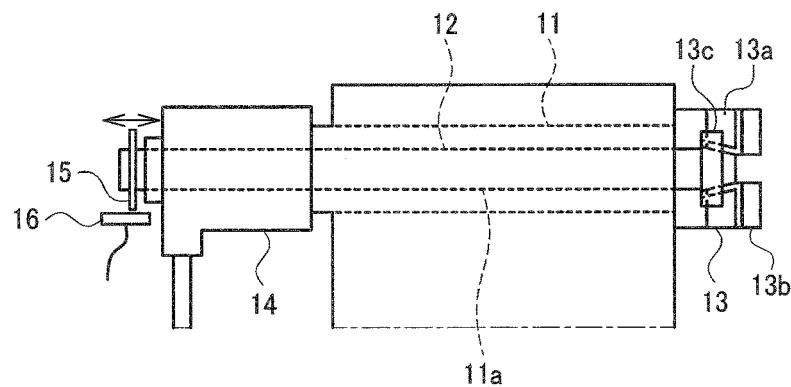
FIG. 1A is a view illustrating a hollow spindle provided with a chuck at a distal end portion forming a portion of a machine tool according to the embodiment.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

It is an object of the disclosure to provide a machine tool where the dimension of a workpiece can be measured simultaneously with a motion, such as holding or delivery of the workpiece, in a workpiece processing step.

In accordance with one of some embodiments, there is provided a machine tool comprising:

a hollow spindle including a hollow portion along an axial direction;

a plurality of chuck claws openably mounted at a distal end portion of the hollow spindle, and configured to hold a holding portion of a workpiece;

an operation rod inserted into the hollow portion of the hollow spindle in a movable manner, and configured to close the plurality of chuck claws with movement of the operation rod toward one side in the axial direction and open the plurality of chuck claws with movement of the operation rod toward the other side in the axial direction; and a measuring apparatus configured to measure an opening dimension of the plurality of chuck claws based on a movement amount of the operation rod.

In this specification, a chuck including a plurality of chuck claws that is used in the embodiment may be a chuck including two to four chuck claws concentrically, a so-called collet chuck or the like. That is, provided that the opening dimension of the plurality of chuck claws is increased and reduced in an interlocking manner with the movement of the operation rod, the structure of the chuck is not limited.

For the chuck mounted on the spindle of a lathe or the like, a slide cam mechanism or a rotating cam mechanism may be mentioned, for example. The slide cam mechanism is a mechanism where a plurality of chuck claws are opened and closed in a sliding manner along a plurality of movement guide members inclined with respect to the rotation center axis of the chuck body and including grooves having a T shape in cross section. The rotating cam mechanism is a mechanism where the plurality of chuck claws are driven for opening and closing with the rotation of a cam.

The plurality of chuck claws may hold the outer peripheral portion of the workpiece, or may hold the inner side of the workpiece.

A measuring apparatus used in the embodiment is an apparatus that can detect increasing and reducing of an opening dimension formed by the plurality of chuck claws from variation in the movement amount of the operation rod. The mechanism of the measuring apparatus is not limited.

In accordance with one of some embodiments, the dimension of the holding portion of the workpiece can be measured simultaneously with the holding of the outer peripheral portion or the inner peripheral portion of the workpiece by the plurality of chuck claws. With such a configuration, it is possible to confirm whether or not the workpiece matches with a workpiece registered in advance.

Further, with the measurement of the opening dimension of the plurality of chuck claws, (1) whether or not the workpiece is accurately held by the plurality of chuck claws can be confirmed so that (2) it is possible to detect malfunctions of the chuck or the like that includes the plurality of chuck claws.

The embodiment can be applied to a two-spindle opposed lathe where an R spindle and an L spindle are disposed to oppose on the same axis. In this case, processing, such as lathe turning, is performed on a process portion in a state where the workpiece is held by the chuck of the L spindle and, then, the workpiece can be delivered such that this process portion of the workpiece is held by the chuck of the R spindle. As described above, in the case where the process portion of the workpiece is held by the plurality of chuck claws, and a processing dimension is stored in the storage unit, (3) it is also possible to confirm whether or not the workpiece is correctly processed to have the processing dimension registered in advance.

In accordance with one of some embodiments, there is provided the machine tool, wherein the measuring apparatus includes a stroke sensor that detects the movement amount of the operation rod, and a calculation unit that converts the movement amount of the operation rod into the opening dimension of the plurality of chuck claws.

The stroke sensor that detects the movement amount of the operation rod may be of a contact type or a non-contact type.

For the stroke sensor of a non-contact type, a sensor that detects variation in inductance of a coil disposed in parallel to the moving direction of a detecting dog provided to the operation rod, a sensor that optically detects the movement amount of the dog and the like may be mentioned as examples.

In accordance with one of some embodiments, there is provided the machine tool, wherein the measuring apparatus includes a correction unit that causes a detection value detected by the stroke sensor to be linearly approximated to make a correction.

With such a configuration, even if the detection of the stroke sensor has a fluctuation, it is possible to make a correction to a more accurate value.

In accordance with one of some embodiments, the machine tool may comprise:

a storage unit configured to store a plurality of dimensions relating to the holding portion in association with plural kinds of workpieces to be processed; and a comparison unit configured to compare the opening dimension of one of the plural kinds of workpieces measured by the measuring apparatus and a corresponding dimension of the plurality of dimensions stored in the storage unit.

With such a configuration, confirming and detection (1) to (3) described above can be performed on plural kinds of workpieces.

In accordance with one of some embodiments, the machine tool may comprise:

a storage unit configured to store a dimension relating to the holding portion that is common to a plurality of workpieces to be processed, a time series storage unit configured to record, in time series, a plurality of opening dimensions of the plurality of workpieces measured by the measuring unit; and an analysis unit configured to analyze time-series variation in dimension by comparing the plurality of opening dimensions stored in the time series storage unit and the dimension relating to the holding portion stored in the storage unit.

A measurement target may contain, in addition to variation in the dimension of the workpiece, data relating to the operation of the chuck, such as variation in opening/closing speed of the chuck or variation in opening/closing time of the chuck. Accordingly, a timer means or the like may be added.

Based on the analysis of variation in the dimension of the workpiece or the variation amount of additional data, NC command coordinates may be corrected or a processing program may be modified. Alternatively, the analysis may be applicable to finding or predicting abnormality in the spindle, the chuck, tools or the like at an early stage.

Further, these variations in measured value can be analyzed in time series and hence, these variations may also be utilized for modifying a processing program or for correcting coordinates of a tool, coordinates of a processing point or the like.

A machine tool according to one embodiment of the disclosure will be described with reference to drawings.

FIG. 1A illustrates a spindle of the machine tool. The machine tool includes a hollow spindle 11 attached to a spindle stock not illustrated in the drawing. A hollow portion 11a is formed in the hollow spindle 11 along the axial direction of the hollow spindle 11. An operation rod 12 is inserted into the hollow portion 11a.

Figure 1B:
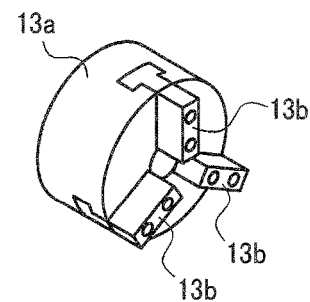
FIG. 1B is a perspective view of the chuck illustrated in FIG. 1A.
Figure 3:
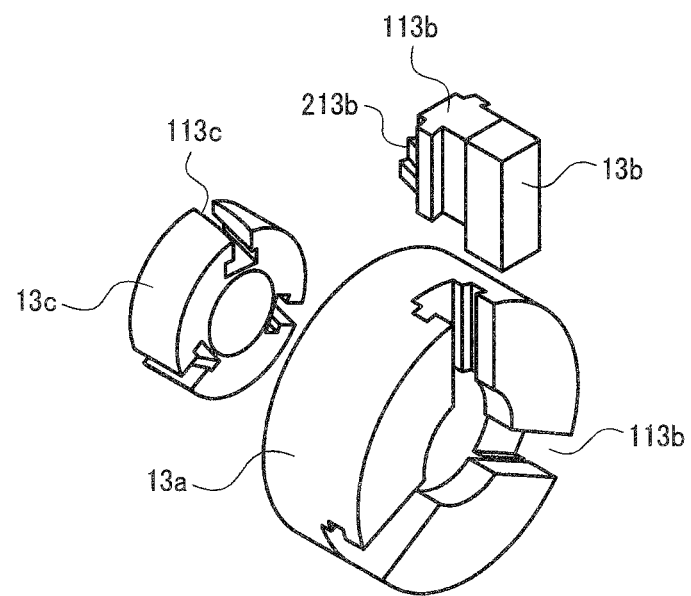
FIG. 3 is a view illustrating a chuck of a slide cam type.

A chuck 13 is mounted on the distal end portion of the hollow spindle 11. As illustrated in FIG. 1B and FIG. 3, the chuck 13 includes a chuck body 13a and a plurality of, for example, three chuck claws 13b openably supported on the chuck body 13a. In this embodiment, three slide groove portions 113a having a substantially T shape in cross section are formed on the chuck body 13a radially from the center portion of the chuck body 13a, and the three chuck claws 13b are mounted in these slide groove portions 113a.

As illustrated in FIG. 1A and FIG. 3, the chuck body 13a includes, on the center side of the rear surface, a slide cam 13c connected to the distal end side of the operation rod 12. The slide cam 13c includes operation groove portions 113c that correspond to the three chuck claws 13b.

Each chuck claw 13b includes a sliding portion 113b that is, along the slide groove portion 113a formed in the chuck body 13a, slidably movable inward and outward in the radial direction toward the axis of the hollow spindle 11. The chuck claw 13b includes an action portion 213b that is mounted in the operation groove portion 113c formed on the slide cam 13c, and moves according to the forward movement or backward movement of the slide cam 13c.

Figure 1C:
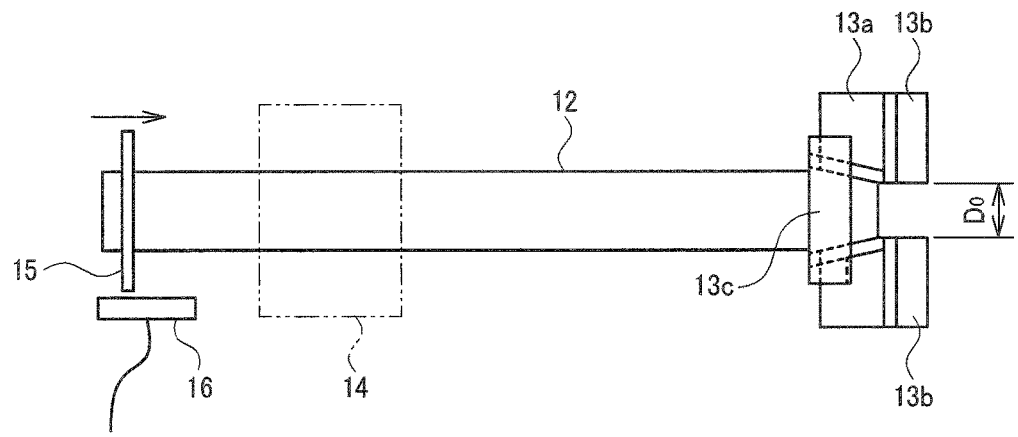
FIG. 1C is a view illustrating a state where an operation rod is moved backward in the hollow spindle so as to close a plurality of chuck claws (opening dimension $D_0$).
Figure 1D:
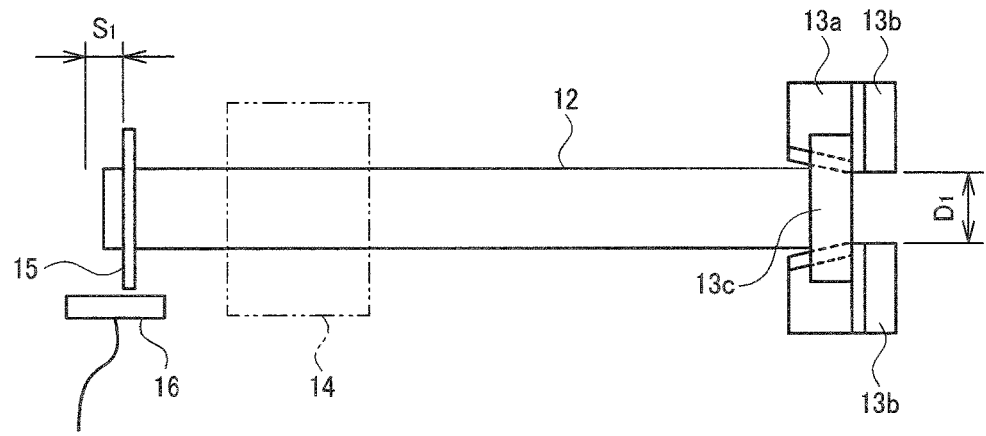
FIG. 1D is a view illustrating a state where the operation rod is moved forward in the hollow spindle so as to open the plurality of chuck claws (opening dimension $D_1$).

The forward and backward movement of the operation rod 12 in the axial direction of the operation rod 12 causes the plurality of chuck claws 13b to be opened and closed. As illustrated in FIG. 1C, with the movement of the operation rod 12 toward one side in the axial direction of the operation rod 12 (for example, backward movement), the plurality of chuck claws 13b are closed so that the opening dimension of the chuck claws 13b is reduced to a dimension $D_0$. With such reduction, the chuck 13 can hold a workpiece. As illustrated in FIG. 1D, with the movement of the operation rod 12 toward the other side in the axial direction of the operation rod 12 (for example, forward movement from the position illustrated in FIG. 1C by a distance $S_1$), the slide cam 13c moves forward so that the plurality of chuck claws 13b are opened, thus increasing the opening dimension of the chuck claws 13b to a dimension $D_1$. With such an increase, the workpiece can be removed from the chuck 13.

The forward and rearward movement operation of the operation rod 12 is performed by controlling a hydraulic pressure of a chuck cylinder 14 provided on the rear portion side of the operation rod 12. A rod driven by the chuck cylinder 14 and the operation rod 12 may be connected with each other. In this embodiment, a dog 15 that is a detection target is attached to a portion of the operation rod 12 positioned rearward of the chuck cylinder 14. The position of this dog 15 is detected by an electromagnetic stroke sensor 16, for example.

Figure 5:
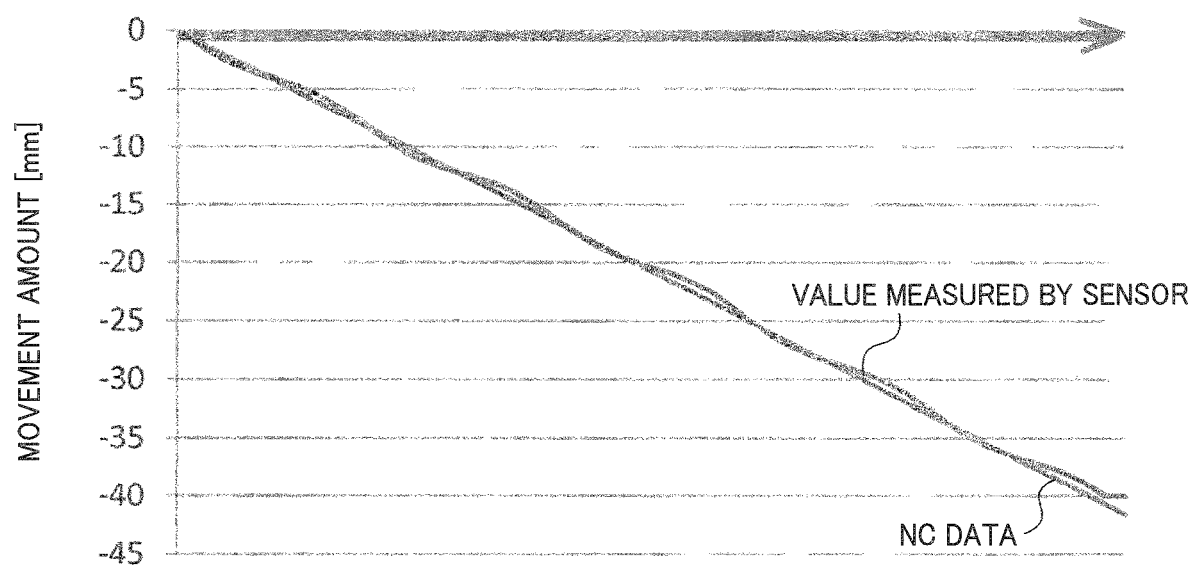
FIG. 5 illustrates the relationship between a movement amount of the operation rod and the opening dimension of holding chuck claws.

FIG. 5 illustrates the results of the investigation on a value of the movement amount S of the dog 15 detected by the stroke sensor 16 and an opening dimension D actually formed by the three chuck claws 13b. In FIG. 5, the movement amount of the dog 15 is taken on an axis of ordinates, and variation in opening dimension is taken on an axis of abscissas. In FIG. 5, values measured by the stroke sensor 16 and data in an NC device installed on the machine tool are respectively illustrated.

Although wave-shaped variation is slightly seen in the movement amount detected by the stroke sensor 16 from FIG. 5, it can be confirmed from FIG. 5 that the movement amount is proportional to opening amount of an opening dimension D of the plurality of chuck claws 13b. Accordingly, it can be understood that the opening dimension of the chuck 13 can be obtained by detecting the movement amount of the dog 15.

Figure 6:
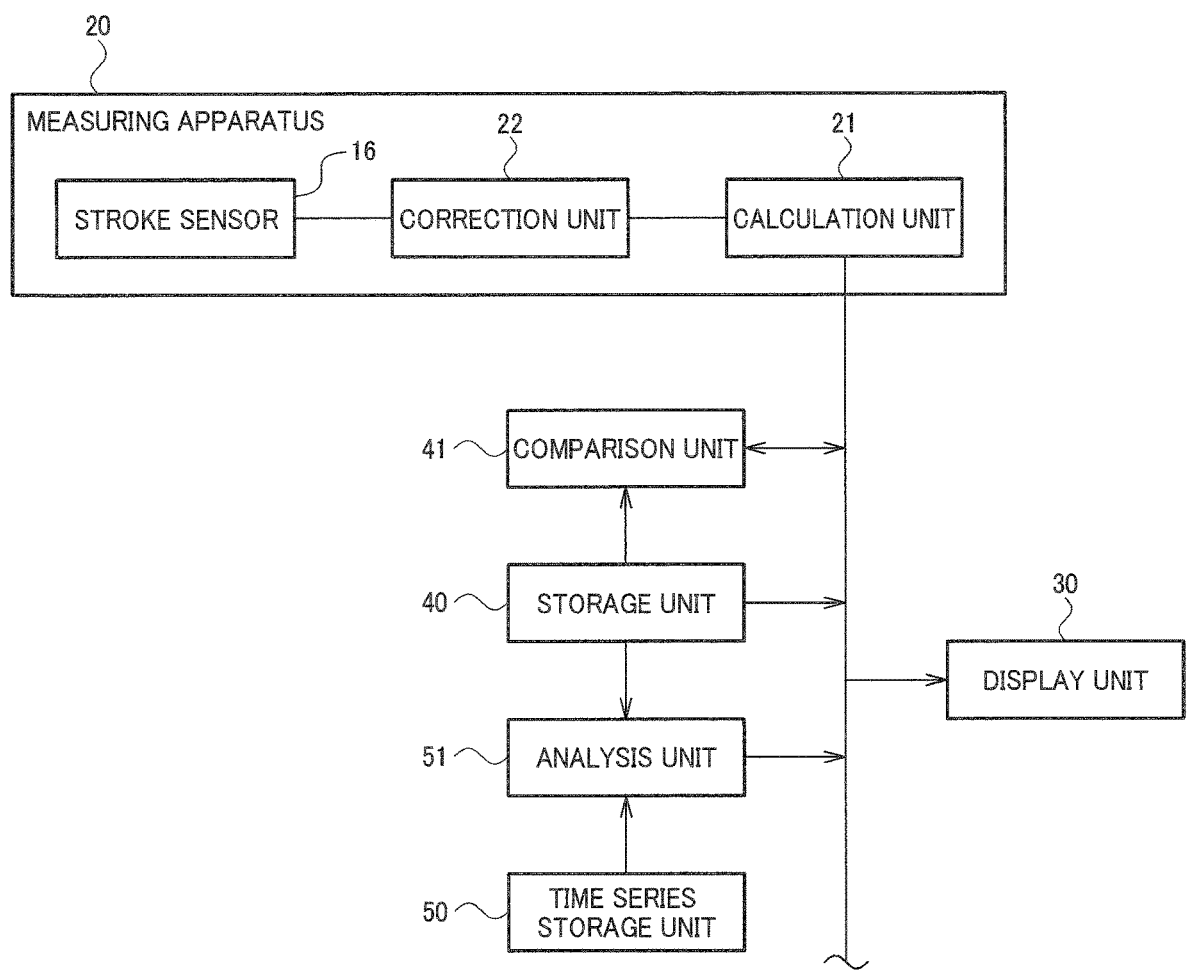
FIG. 6 is a control block diagram of the machine tool.

Therefore, in this embodiment, as illustrated in FIG. 6, a measuring apparatus 20 is provided that measures the opening dimension of the plurality of chuck claws 13b based on the movement amount of the operation rod 12. The measuring apparatus 20 includes the stroke sensor 16 and a calculation unit 21 that converts the movement amount of the operation rod 12 detected by the stroke sensor 16 into the opening dimension of the chuck 13. The measuring apparatus 20 may include a correction unit 22 that causes a detection value detected by the stroke sensor 16 to be linearly approximated to make a correction by a method of least squares or the like, for example.

Figure 2A:
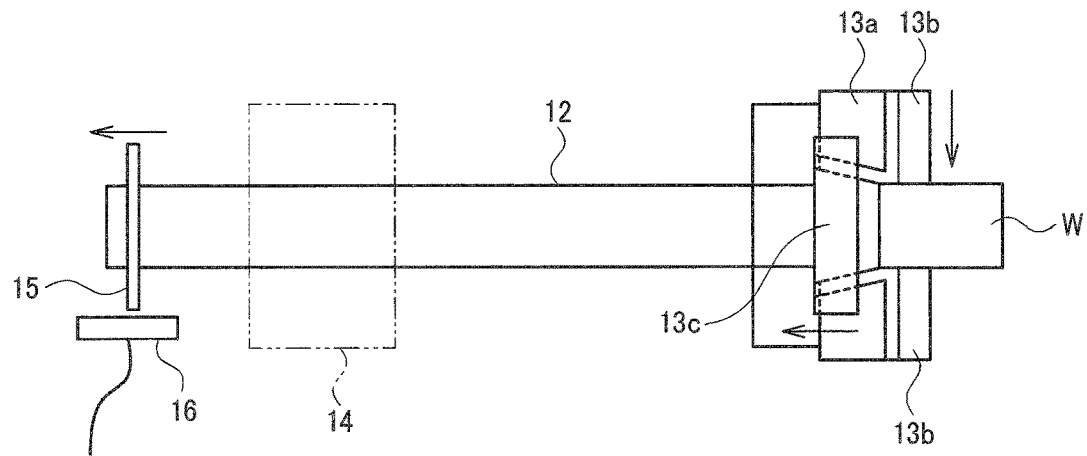
FIG. 2A is a view illustrating a state where a workpiece is held by the plurality of chuck claws.

In the machine tool according to this embodiment, as illustrated in FIG. 2A, for example, when the operation rod 12 is moved backward due to a hydraulic pressure operation of the chuck cylinder 14, a workpiece W is held by the three chuck claws 13b. At this point of operation, the opening dimension D is equal to the outer diameter dimension of the holding portion of the workpiece W. The opening dimension D of the plurality of chuck claws 13b corresponds to the movement amount of the operation rod 12. Accordingly, the outer diameter dimension of the holding portion of the workpiece W is measured by detecting the movement amount of the operation rod 12.

As illustrated in FIG. 6, a measured value obtained by the calculation unit 21 may be displayed on a display unit 30 provided to an operation unit, such as an operation panel of the machine tool.

Further, as illustrated in FIG. 6, the machine tool may include a storage unit 40 that stores a plurality of dimensions relating to the holding portion of a workpiece in association with plural kinds of workpieces to be processed. In this case, a comparison unit 41 is further provided that compares the opening dimension of one of the plural kinds of workpieces measured by the measuring apparatus 20 and a corresponding dimension of a plurality of dimensions stored in the storage unit 40.

When the chuck 13 holds the workpiece W, the dimension of the holding portion of the workpiece is outputted from the storage unit 40 and is displayed on the display unit 30. The comparison unit 41 compares the opening dimension measured by the measuring apparatus 20 and the dimension of the holding portion of the workpiece W stored in the storage unit 40 and displayed on the display unit 30. When the comparison results are matched, such a match is displayed on the display unit 30.

Figure 2B:
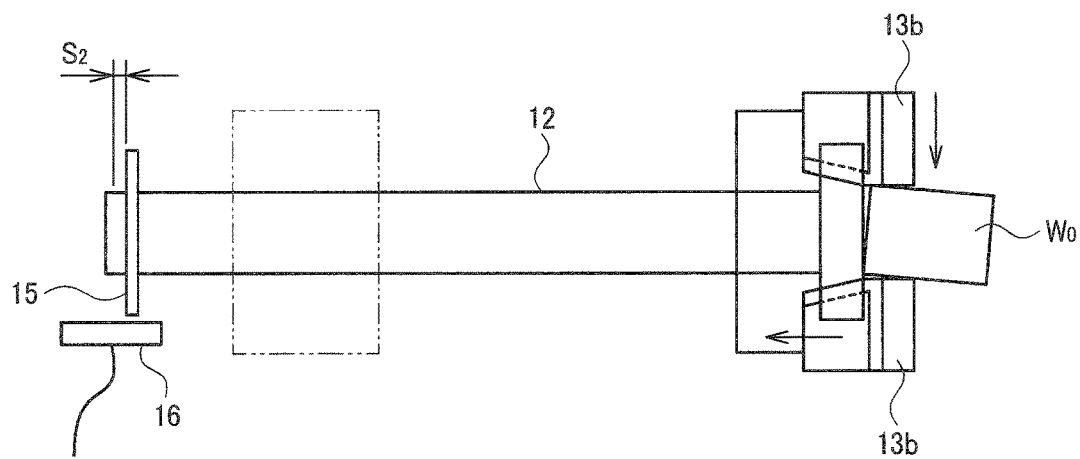
FIG. 2B is a view illustrating an example where a workpiece is not sufficiently seated.

In contrast, as illustrated in FIG. 2B, for example, there may be a case where a workpiece $W_0$ is not correctly seated, or a foreign substance or the like is present between the workpiece and the chuck claws 13b. In this case, a difference is generated between a movement amount $S_2$ of the dog 15 of the operation rod 12 and a value registered in the storage unit 40 in advance, that is, the outer diameter of the holding portion of the workpiece $W_0$.

When such a situation occurs, a mismatch is determined by the comparison unit 41 and hence, failure can be detected. Such a mismatch is displayed on the display unit 30 so as to give a warning.

A similar situation may occur also due to breakage or the like of the chuck, the bolding pawl or other members. Accordingly, the embodiment may also be effectively used as a fault diagnosis system for the machine tool.

Further, the storage unit 40 illustrated in FIG. 6 can store a dimension relating to a holding portion that is common to a plurality of workpieces to be processed. In this case, the machine tool may further include a time series storage unit 50 and an analysis unit 51. The time series storage unit 50 records, in time series, a plurality of opening dimensions of the plurality of workpieces measured by the measuring apparatus 20. The analysis unit 51 compares each of the plurality of opening dimensions stored in the time series storage unit 50 and the common dimension stored in the storage unit 40 so as to analyze time-series variation in dimension.

Based on the results of an analysis performed by the analysis unit 51, an operator may modify a processing program, or correct or modify NC command coordinates when necessary.

A measurement target may contain, in addition to variation in the dimension of the workpiece, data relating to the operation of the chuck, such as variation in opening/closing speed of the chuck or variation in opening/closing time of the chuck. Accordingly, a timer means or the like may be added.

Based on the analysis of variation in the dimension of the workpiece or the variation amount of additional data, NC command coordinates may be corrected or a processing program may be modified. Alternatively, the analysis may be applicable to finding or predicting abnormality in the spindle, the chuck, tools or the like at an early stage. Further, these variations in measured value can be analyzed in time series and hence, these variations may also be utilized for modifying a processing program or for correcting coordinates of a tool, coordinates of a processing point or the like.

Figure 2C:
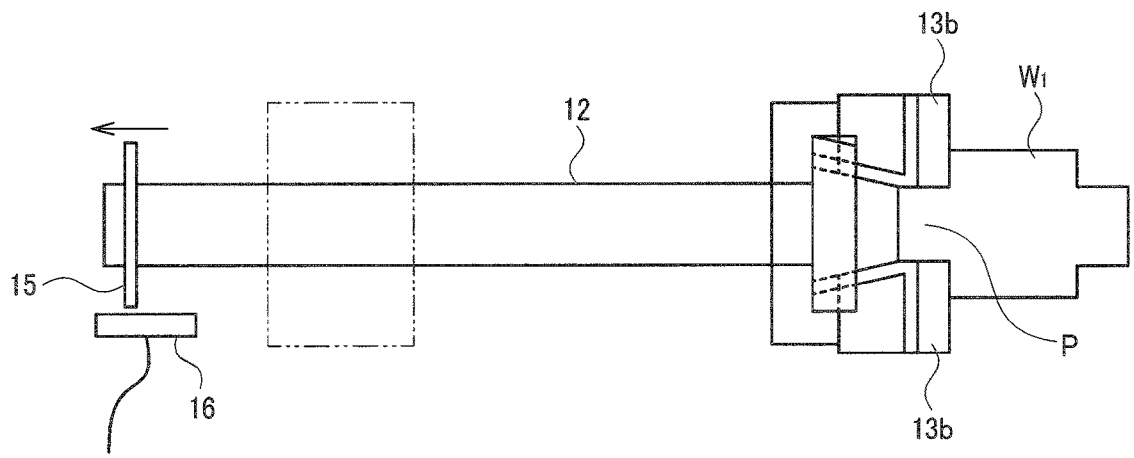
FIG. 2C is a view illustrating a state where the processing dimension of a workpiece is measured.

For example, FIG. 2C illustrates a state where a two-spindle opposed lathe is used as a machine tool, a workpiece is processed on one spindle, and the workpiece is delivered to a chuck of the other spindle. The outer diameter dimension of a processed portion P of a workpiece $W_1$ is measured by the measuring apparatus 20 simultaneously with the holding of the workpiece $W_1$ by the chuck 13.

By comparing this measured value with a value registered in the storage unit 40 in advance, the comparison unit 41 can automatically judge the quality of the processing.

Figure 4:
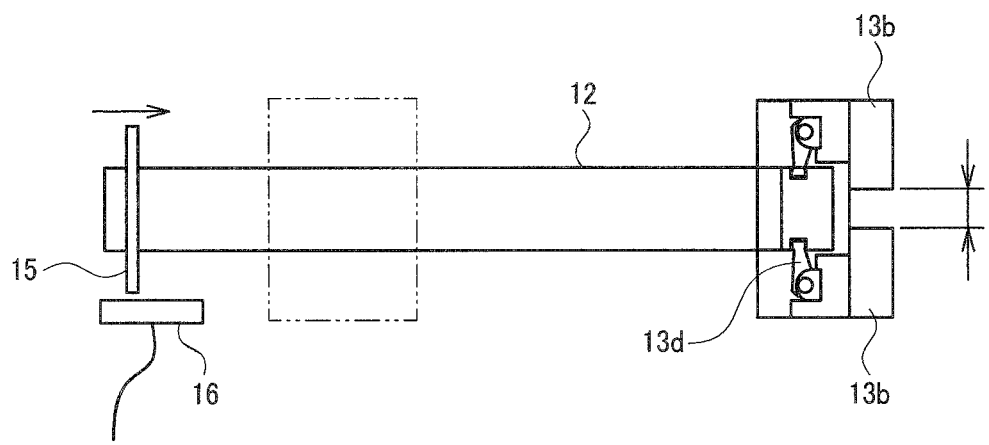
FIG. 4 is a view schematically illustrating a chuck of a turning cam type.

In the embodiment, the mechanism of the chuck is not limited. For example, as illustrated in FIG. 4, the chuck may be configured such that the holding chuck claws 13b are opened/closed due to turning of a turning cam 13d connected to the operation rod 12.

What is claimed is:

1. A machine tool comprising:
two spindles one of which is a hollow spindle including a hollow portion along an axial direction;
a plurality of chuck claws openably mounted at a distal end portion of the hollow spindle, and configured to hold a holding portion of a workpiece;
an operation rod inserted into the hollow portion of the hollow spindle in a movable manner, and configured to close the plurality of chuck claws with movement of the operation rod toward one side in the axial direction and open the plurality of chuck claws with movement of the operation rod toward the other side in the axial direction;
a measuring apparatus configured to measure an opening dimension of the plurality of chuck claws based on a movement amount of the operation rod, and configured to measure a processed dimension of the holding portion simultaneously with holding the holding portion with the plurality of chuck claws; and
a comparison unit configured to judge a quality of the processed dimension by comparing a measured value of the processed dimension with a value registered in a storage unit,
wherein the measuring apparatus includes
a stroke sensor configured to detect the movement amount of the operation rod,
a calculation unit configured to convert the movement amount of the operation rod into the opening dimension of the plurality of chuck claws, and
a correction unit configured to cause a detection value detected by the stroke sensor to be linearly approximated to make a correction.

2. The machine tool according to claim 1, wherein:
the storage unit is configured to store a plurality of dimensions relating to the holding portion in association with plural kinds of workpieces to be processed; and
the comparison unit is configured to compare an opening dimension of one of the plural kinds of workpieces measured by the measuring apparatus and a corresponding dimension of the plurality of dimensions stored in the storage unit.

3. The machine tool according to claim 1,
wherein the storage unit is configured to store a dimension relating to the holding portion that is common to a plurality of workpieces to be processed, and
the machine tool further comprising:
a time series storage unit configured to record, in time series, a plurality of opening dimensions of the plurality of workpieces measured by the measuring apparatus; and
an analysis unit configured to analyze time-series variation in dimension by comparing the plurality of opening dimensions stored in the time series storage unit and the dimension relating to the holding portion stored in the storage unit.

* * * * *